Patented July 14, 1942

UNITED STATES PATENT OFFICE 2,289,550

NITRO BORNYL PHENOLS AS INSECTICIDES

Richard O. Roblin, Jr., and Ingenuin Hechenbleikner, Stamford, Conn., assignors to American Cyanamid Company, New York, N. Y., a corporation of Maine No Drawing. Application August 7, 1940,
Serial No. 351,778

3 Claims. (Cl. 167—31)

The present invention relates to insecticides and more particularly to nitrated bornyl phenols which are especially effective as contact poisons for the control of insect pests.

The invention is based upon the discovery that the nitro bornyl phenol compounds and their homologues possess a powerful insecticidal activity against insects which are particularly difficult to exterminate, for example the red spider and black scale, and that such activity is attained without any substantial harmful or detrimental action on the vegetation infested with the insect.

The above compounds may be prepared by forming the sulphonic acid derivative of the corresponding bornyl phenol and subsequently nitrating the said sulphonic acid derivative.

The bornyl phenols may be prepared as follows: 21 parts by weight of bornyl chloride were dissolved in 10 parts of toluene. The resulting solution together with 12 parts of phenol was introduced into a reaction vessel equipped with a stirrer, thermometer and condenser. One part of catalyst (Filtrol impregnated with 5% of its weight of zinc chloride) was added and the mixture stirred slowly during the course of the reaction. The temperature was raised gradually to 125° C. The reaction was substantially completed in 2 hours. The solution was filtered from the Filtrol and washed with a large excess of water. After drying with sodium sulphate and separation from the solvent, the crude bornyl phenol product was distilled under reduced pressure. A thick viscous liquid distilling between 125° C. and 145° C. at less than 1 mm. was obtained which upon cooling to room temperature set to a mushy colorless solid. The distillate was dissolved in petroleum ether and cooled externally with carbon dioxide. Colorless crystalline bornyl phenol separated. The solid was filtered from the solution and after recrystallization from petroleum ether, melted at 109° C. The petroleum ether was removed from the filtrate by distillation. The bornyl phenol residue was a colorless viscous liquid which distilled at 130° C. at less than 1 mm. pressure.

In preparing the mononitro or dinitro bornyl phenols, two or one mole equivalents respectively of bornyl phenol are added to at least 2.5 mole equivalents of concentrated sulphuric acid. The temperature is maintained at 75–85° C. during the addition. An excess of water is added after the formation of the sulphonic acid derivative is effected. The resulting bornyl phenol sulphonic acid solution is added slowly with stirring to at least 2.5 mole equivalents of concentrated nitric acid, maintaining the temperature between 70° and 85° C. The nitration step may be carried out by gradually adding the nitric acid to the sulphonic acid solution. The reaction mixture is then cooled and the resulting product separated.

The following examples illustrate in detail the preparation of representative compounds of the invention. Parts indicated are by weight.

Example 1

40 parts of crystalline bornyl phenol (M. P. 109° C.) were dissolved in 64 parts of concentrated sulphuric acid. The solution was heated at approximately 80° C. for 15 minutes. 200 parts of water were then added to the sulphonated mixture. 57 parts of concentrated nitric acid were added slowly to the sulphonated mixture with rapid stirring during a period of 45 minutes. The temperature was maintained between 70° and 80° C. 700 parts of water were then added to the nitration mixture, agitation and heating at about 80° C. being continued for 2 hours. The resulting mixture was poured into a bath of ice water. The dinitro bornyl phenol separated in the form of a yellow sticky solid. After recrystallization from petroleum ether, the yellow crystalline product melted at 70° C.

Example 2

24 parts of liquid bornyl phenol (a colorless viscous liquid which distilled at 130° C. at less than 1 mm.) were gradually added to 38.6 parts of concentrated sulphuric acid. The resulting solution was heated for 15 minutes at about 80° C. 120 parts of water were then added to the sulphonated mixture, followed by the gradual addition of 34.1 parts of concentrated nitric acid during a period of 45 minutes. The mixture was stirred rapidly and the temperature held between 70° and 80° C. during the addition of the nitric acid. 420 parts of water were then added to the nitration mixture, agitation and heating at 80° C. being continued for 2 hours. The resulting mixture was poured into a bath of ice water. The dinitro bornyl phenol separated in the form of a deep red oil. The product was removed from the aqueous layer, washed free of acid and dried.

Example 3

23 parts of liquid bornyl phenol (a fraction distilling at 120–135° C. at less than 1 mm.) were added slowly to 44.2 parts of concentrated sulphuric acid. The solution was heated to 85° C. for 15 minutes and then diluted with 70 parts of water. The bornyl phenol sulphonic acid solution was added slowly to 28.4 parts of concentrated nitric acid diluted with 10 parts of water. The temperature was allowed to rise to 75° C. and the sulphonic acid solution added at such a rate that the temperature remained constant. The nitration mixture was then agitated and heated at 80–85° C. for 2 hours. Upon cooling the reaction mixture to room temperature the dinitro bornyl phenol separated as an oil. The product was removed from the acid residue, washed thoroughly with water and dried.

Example 4

46 parts of liquid bornyl phenol (a fraction distilling at 120–135° C. at less than 1 mm.) were gradually added to 44.2 parts of concentrated sulphuric acid. The solution was heated at approximately 80° C. for 15 minutes and then diluted with 85 parts of water. The bornyl phenol sulphonic acid solution was added slowly to 28.4 parts of concentrated nitric acid diluted with 15 parts of water, the temperature being held at approximately 75° C. The nitration mixture was then agitated and heated at 80° to 85° C. for 2 hours. Upon cooling the mixture to room temperature the mononitro bornyl phenol separated as a light red oil. The product was removed from the aqueous layer, washed free of acid and dried.

Spray solutions were prepared by dissolving the above insecticidal compounds in a solvent medium consisting of 65% acetone and 35% water. The following table shows the kills obtained under comparable conditions when the sprays were applied to the citrus red spider.

Table

| Compound | Dilution | Kill |
| --- | --- | --- |
| | | Percent |
| Liquid dinitro bornyl phenol | *1–5,000 | 100 |
| Do | 1–20,000 | 100 |
| Do | 1–40,000 | 84.1 |
| Solid dinitro bornyl phenol | *1–1,250 | 100 |
| Do | 1–5,000 | 97.5 |
| Do | 1–10,000 | 85.6 |

*A 100% kill of the red spider eggs is obtained in conjunction with the 100% kill of the active forms.

The nitrated bornyl phenols in the form of their salts have been found toxic not only to the red spider mite, but also to the black scale, when incorporated into sprays and applied to citrus fruit trees.

Among the substances which may be utilized in forming salts of the nitrated bornyl phenols are the oxides and hydroxides of the alkali and alkaline earth metals, ammonia and amines. Many of these salts are water soluble and may be applied in aqueous solution together with wetting or spreading agents.

A spray (prepared by dissolving 1 part by weight of a nitrated bornyl phenol in one part of 10% sodium hydroxide and diluting with tap water) of 1–500 dilution killed 97.6% of the black scale while a 1–1000 dilution produced a 100% kill of the citrus red spider mites and their eggs.

These compounds may also be incorporated in dusts, such as walnut shell, talc, and the like.

Insecticides of this type may be used on citrus trees without danger of leaf burn even under very unfavorable weather conditions.

While the invention has been described with particular reference to specific embodiments, it is to be understood that it is not to be limited thereto but is to be construed broadly and restricted solely by the scope of the appended claims.

We claim:

1. An insecticidal composition comprising essentially a substance selected from the group consisting of mono and di nitrated bornyl phenols, and their salts.

2. An insecticidal composition containing as its essential active ingredient a liquid dinitro bornyl phenol.

3. An insecticidal composition containing as its essential active ingredient a solid dinitro bornyl phenol.

RICHARD O. ROBLIN, Jr.
INGENUIN HECHENBLEIKNER.